United States Patent
Yuan et al.

(10) Patent No.: US 12,557,039 B2
(45) Date of Patent: Feb. 17, 2026

(54) REPORTING FOR MAXIMUM PERMISSIBLE EXPOSURE

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 756 days.

(21) Appl. No.: 17/758,259

(22) PCT Filed: Feb. 11, 2020

(86) PCT No.: PCT/CN2020/074689
§ 371 (c)(1),
(2) Date: Jun. 30, 2022

(87) PCT Pub. No.: WO2021/159265
PCT Pub. Date: Aug. 19, 2021

(65) Prior Publication Data
US 2023/0022469 A1    Jan. 26, 2023

(51) Int. Cl.
*H04W 52/36* (2009.01)
*H04B 7/06* (2006.01)
*H04W 16/28* (2009.01)
*H04W 72/23* (2023.01)
*H04W 74/0833* (2024.01)

(52) U.S. Cl.
CPC ...... *H04W 52/367* (2013.01); *H04B 7/06952* (2023.05); *H04W 16/28* (2013.01); *H04W 72/23* (2023.01); *H04W 74/0841* (2013.01)

(58) Field of Classification Search
CPC ... H04W 52/357; H04W 72/23; H04W 16/28; H04B 7/06952
See application file for complete search history.

(56) References Cited

U.S. PATENT DOCUMENTS

| 10,425,200 B2 | 9/2019 | Islam et al. |
| 2013/0271322 A1 | 10/2013 | Harel et al. |

(Continued)

FOREIGN PATENT DOCUMENTS

| WO | 2017180348 | 10/2017 |
| WO | 2017197096 | 11/2017 |

OTHER PUBLICATIONS

International Search Report and Written Opinion—PCT/CN2020/074689—ISAEPO—Oct. 13, 2020.

(Continued)

*Primary Examiner* — William Nealon
(74) *Attorney, Agent, or Firm* — Dalei Dong; Harrity & Harrity, LLP (57) ABSTRACT

Various aspects of the present disclosure generally relate to wireless communication. In some aspects, a user equipment (UE) may determine that a maximum permissible exposure (MPE) condition is satisfied for the UE; transmit, to a base station, a message based at least in part on determining that the MPE condition is satisfied; and transmit, to the base station based at least in part on the MPE condition being satisfied, beam information indicating an updated transmit beam for the UE. Numerous other aspects are provided.

26 Claims, 6 Drawing Sheets

(56) References Cited

U.S. PATENT DOCUMENTS

| | | | |
|---|---|---|---|
| 2017/0332333 A1 | 11/2017 | Santhanam et al. | |
| 2017/0359114 A1* | 12/2017 | Akkarakaran | H04L 5/0094 |
| 2018/0278318 A1 | 9/2018 | Chakraborty et al. | |
| 2019/0141692 A1 | 5/2019 | Subramanian et al. | |
| 2019/0200337 A1 | 6/2019 | Zhou et al. | |
| 2019/0238202 A1 | 8/2019 | Chavva et al. | |
| 2019/0261289 A1 | 8/2019 | Raghavan et al. | |
| 2020/0029320 A1 | 1/2020 | Ryu et al. | |
| 2022/0256473 A1* | 8/2022 | Kiilerich Pratas | H04W 52/367 |
| 2023/0058930 A1* | 2/2023 | Matsumura | H04W 52/365 |
| 2023/0083588 A1* | 3/2023 | Matsumura | H04W 52/146 |
| | | | 455/522 |

OTHER PUBLICATIONS

Apple: "Considerations on Multi-Panel and MPE in FR2", 3GPP TSG RAN WG1 #97, R1-1907343, 3rd Generation Partnership Project, Mobile Competence Centre, 650, Route Des Lucioles, F-06921 Sophia-Antipolis Cedex, France, vol. Reno, USA, May 13-17, 2019, May 17, 2019, XP051709365, pp. 1-6, Section 2-3.

Apple Inc: "Remaining Issues on Multi-Beam Operation", R1-1909048, 3GPP TSG-RAN WG1 #98, 3rd Generation Partnership Project, Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019, XP051765652, 12 Pages, p. 7-p. 10, Section 5, Figures 5-1.

LG Electronics: "Feature Lead Summary of Enhancements on Multi-Beam Operations", 3GPP TSG RAN WG1 Ad-Hoc Meeting 1901, R1-1901348 R1_AH1901, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 23, 2019, XP051594124, Section 3.4.

Qualcomm Incorporated: "Enhancements on Multi-Beam Operation", 3GPP Draft, 3GPP TSG-RAN WG1 Meeting #96-Bis, R1-1905027, Enhancements on Multi-Beam Operation, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 7, 2019 (Apr. 7, 2019), XP051700136, 26 pages, paragraph [0002], Section 1; p. 1, Section 2.5; p. 9.

Supplementary European Search Report—EP20918886—Search Authority—The Hague—Oct. 5, 2023.

* cited by examiner

REPORTING FOR MAXIMUM PERMISSIBLE EXPOSURE

CROSS-REFERENCE TO RELATED APPLICATION

This application is a 371 national stage of Patent Cooperation Treaty (PCT) Application No. PCT/CN2020/074689 filed on Feb. 11, 2020, entitled "REPORTING FOR MAXIMUM PERMISSIBLE EXPOSURE," which is hereby expressly incorporated by reference herein.

FIELD OF THE DISCLOSURE

Aspects of the present disclosure generally relate to wireless communication and to techniques and apparatuses for reporting for maximum permissible exposure (MPE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a maximum permissible exposure (MPE) condition is satisfied for the UE; transmitting, to a base station, a message based at least in part on determining that the MPE condition is satisfied; and transmitting, to the base station based at least in part on the MPE condition being satisfied, beam information indicating an updated transmit beam for the UE.

In some aspects, a method of wireless communication, performed by a base station, may include receiving, from a UE, a message indicating that an MPE condition of the UE is satisfied; receiving, from the UE based at least in part on the MPE condition being satisfied, beam information indicating an updated transmit beam for the UE; and communicating with the UE based at least in part on the updated transmit beam.

In some aspects, a UE for wireless communication may include a memory and one or more processors operatively coupled to the memory. The memory and the one or more processors may be configured to determine that an MPE condition is satisfied for the UE; transmit, to a base station, a message based at least in part on determining that the MPE condition is satisfied; and transmit, to the base station based at least in part on the MPE condition being satisfied, beam information indicating an updated transmit beam for the UE.

In some aspects, a base station for wireless communication may include a memory and one or more processors operatively coupled to the memory. The memory and the one or more processors may be configured to receive, from a UE, a message indicating that an MPE condition of the UE is satisfied; receive, from the UE based at least in part on the MPE condition being satisfied, beam information indicating an updated transmit beam for the UE; and communicate with the UE based at least in part on the updated transmit beam.

In some aspects, a non-transitory computer-readable medium may store one or more instructions for wireless communication. The one or more instructions, when executed by one or more processors of a UE, may cause the one or more processors to determine that an MPE condition is satisfied for the UE; transmit, to a base station, a message based at least in part on determining that the MPE condition is satisfied; and transmit, to the base station based at least in part on the MPE condition being satisfied, beam information indicating an updated transmit beam for the UE.

In some aspects, a non-transitory computer-readable medium may store one or more instructions for wireless communication. The one or more instructions, when executed by one or more processors of a base station, may cause the one or more processors to receive, from a UE, a message indicating that an MPE condition of the UE is satisfied; receive, from the UE based at least in part on the MPE condition being satisfied, beam information indicating an updated transmit beam for the UE; and communicate with the UE based at least in part on the updated transmit beam.

In some aspects, an apparatus for wireless communication may include means for determining that an MPE condition is satisfied for the apparatus; means for transmitting, to a base station, a message based at least in part on determining that the MPE condition is satisfied; and means for transmitting, to the base station based at least in part on the MPE condition being satisfied, beam information indicating an updated transmit beam for the apparatus.

In some aspects, an apparatus for wireless communication may include means for receiving, from a UE, a message indicating that an MPE condition of the UE is satisfied; means for receiving, from the UE based at least in part on the MPE condition being satisfied, beam information indicating an updated transmit beam for the UE; and means for communicating with the UE based at least in part on the updated transmit beam.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
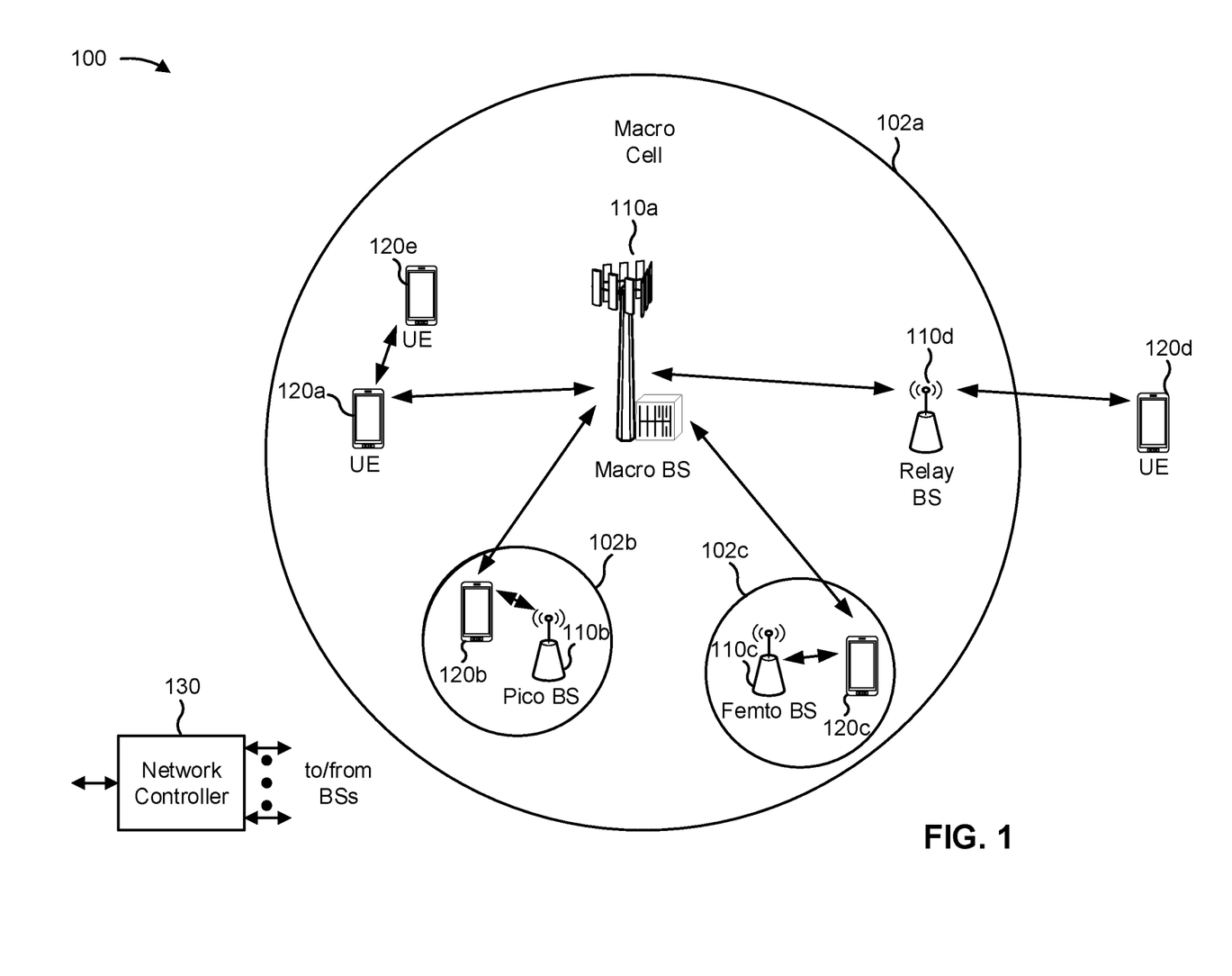
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband interne of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
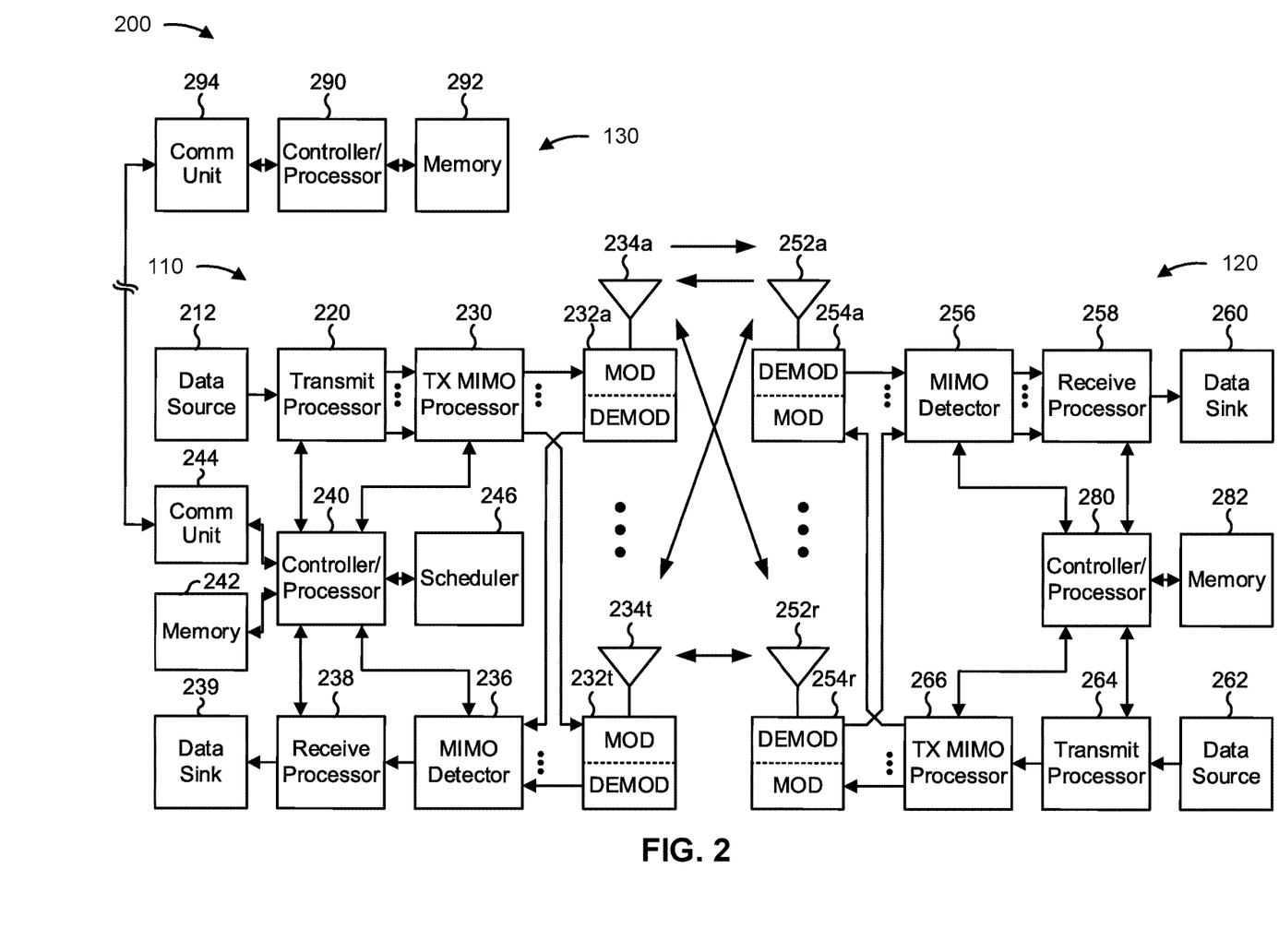
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with reporting for maximum permissible exposure (MPE), as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, UE 120 may include means for determining that an MPE condition is satisfied for the UE 120; means for transmitting, to a base station, a message based at least in part on determining that the MPE condition is satisfied; means for transmitting, to the base station based at least in part on the MPE condition being satisfied, beam information indicating an updated transmit beam for the UE; means for selecting the updated transmit beam from a set of transmit beams that do not exceed the MPE condition; means for selecting a beam on which to transmit the message, wherein the beam is different than a beam associated with satisfying the MPE condition for the UE; means for receiving a response associated with the message; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, a message indicating that an MPE condition of the UE is satisfied; means for receiving, from the UE based at least in part on the MPE condition being satisfied, beam information indicating an updated transmit beam for the UE; means for communicating with the UE based at least in part on the updated transmit beam; means for transmitting a response associated with the message; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Regulatory or other guidelines may impose a maximum permissible exposure (MPE) limit for devices that transmit wireless signals, such as UEs. For example, a UE may be associated with a threshold that defines a limit for the strength of a radio frequency (RF) field or radiation toward a user. When a UE is subject to an MPE condition, a downlink beam may be suitable for use by the UE to communicate with a base station, but a corresponding uplink beam in the same reciprocal beam pair may not be permitted for use, due to the MPE condition. In such a case, the UE may move to an updated uplink beam, that does not satisfy the MPE condition, to continue communication with the base station.

However, some means of beam reselection, such as contention-based physical random access (CB-PRACH), contention-free PRACH for beam failure recovery (CF-BFR-PRACH), and indication of an updated uplink beam on a configured resource, may be unreliable and may negatively impact downlink beam performance and latency. For example, CB-PRACH may involve a large impact on the downlink beam and may increase latency. As another example, CF-BFR-PRACH may involve a large impact on the downlink beam, increase latency, and may be applicable only to the primary cell (PCell) of the UE. As yet another example, a signaling approach on a configured resource, such as a configured resource of a secondary cell (SCell), may rely on the availability of a configured beam for the physical uplink control channel or the physical uplink shared channel, and the configured beam may not consistently be available. Thus, these approaches may reduce throughput on the downlink, increase latency, and be unreliable.

Some techniques and apparatuses described herein provide signaling, by a UE, that an MPE condition is satisfied, while reducing (e.g., minimizing, eliminating) impact on a downlink beam of the UE. For example, the UE may transmit a two-step physical random access channel (PRACH) transmission that indicates that the MPE condition is satisfied and that indicates an updated uplink beam (referred to herein as a two-step scheme and shown in FIG. 4). As another example, the UE may transmit a message indicating that the MPE condition is satisfied, and may receive, on an active downlink beam, an uplink grant for transmission of information indicating an updated uplink beam. By providing the indication using the two-step PRACH transmission or the message, the UE indicates, to the base station, that the MPE condition is satisfied. Furthermore, by receiving a response to the two-step PRACH transmission or the message on the active downlink beam, impact on the downlink is reduced, thereby improving throughput of the downlink and reducing latency.

Figure 3:
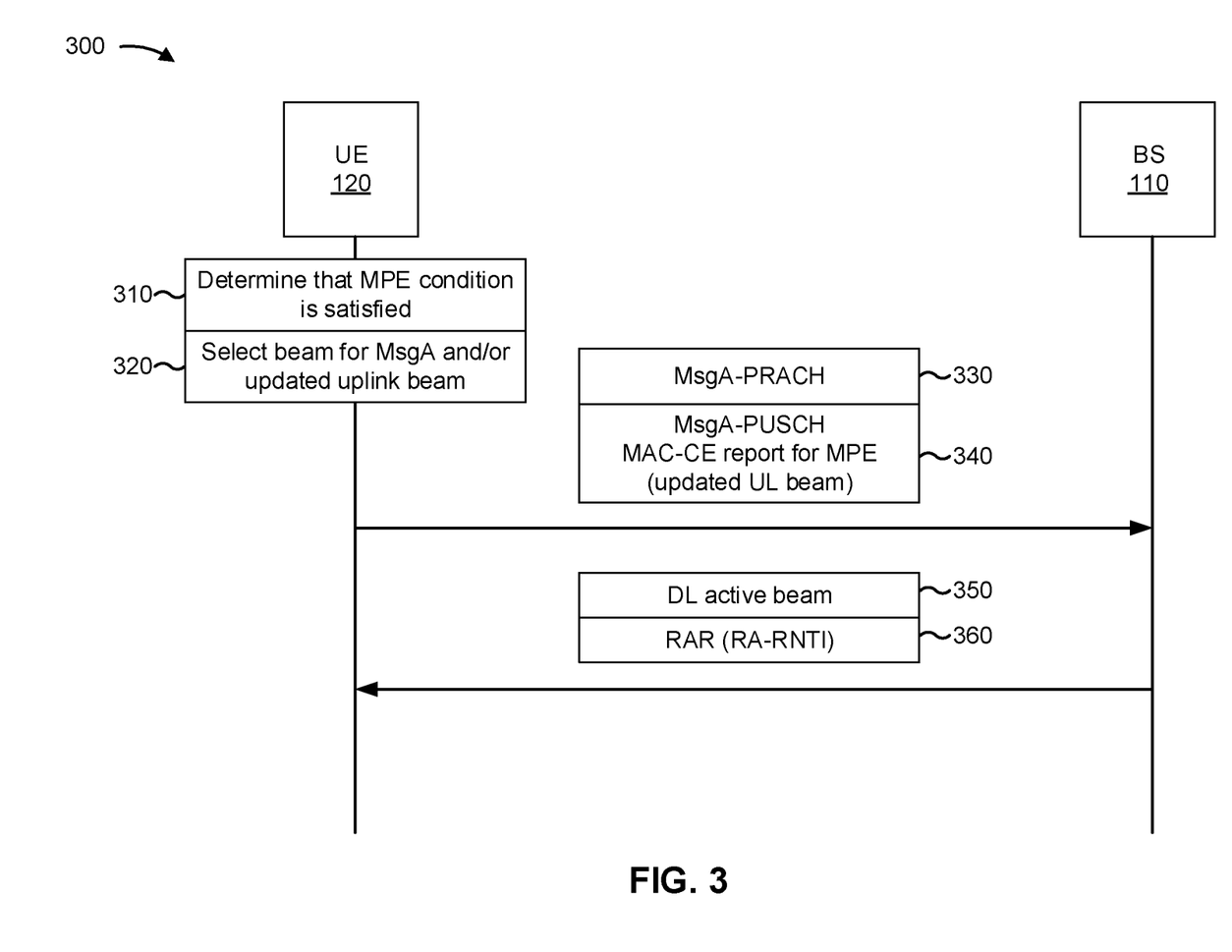
FIG. 3 is a diagram illustrating an example of a first procedure for indicating that an MPE condition is satisfied, in accordance with various aspects of the present disclosure.

FIG. 3 is a diagram illustrating an example 300 of a first procedure for indicating that an MPE condition is satisfied, in accordance with various aspects of the present disclosure. The procedure shown in example 300 involves transmission of a two-step RACH message, and is referred to herein as a two-step scheme. As shown, example 300 includes a UE 120 and a BS 110. The UE 120 and the BS 110 may be associated with a communication link, which may be maintained using transmit beams and receive beams. For example, a downlink between the UE 120 and the BS 110 may be maintained by a transmit beam of the BS 110 and a receive beam of the UE 120, and an uplink between the UE 120 and the BS 110 may be maintained by a transmit beam of the UE 120 and a receive beam of the BS 110. Only the transmit beam of the UE 120 may be problematic from an MPE perspective, since the BS 110 is likely to be sufficiently distant from a user of the UE 120 that the BS 110's transmit beam does not cause significant exposure to the user, and since the receive beam of the UE 120 is created by a spatial filter applied to a set of receive antennas of the UE 120, rather than by energy radiated from a transmit antenna of the UE 120.

As shown by reference number 310, the UE 120 may determine that an MPE condition is satisfied. The MPE condition may relate to one or more transmit beams generated by the UE 120. For example, the UE 120 may determine that a threshold associated with the MPE condition is satisfied. The threshold may relate to, for example, a total radiated power, a maximum output power, an effective isotropic radiated power (EIRP), a radiated power on a single beam, a radiated power on a beam directed toward a user of the UE 120, and/or the like.

As shown by reference number 320, in some aspects, the UE 120 may select a beam for transmission of a message associated with the MPE condition. For example, the UE 120 may select a beam on which to transmit a dedicated Message A PRACH (MsgA-PRACH) for MPE. In some aspects, the UE 120 may choose any transmit beam of the UE 120 for transmission of the message. For example, the UE 120 may choose any transmit beam that is not associated with the MPE condition. As further shown, in some aspects, the UE 120 may select an updated transmit beam for a communication link (e.g., an uplink) between the UE 120 and the BS 110. For example, the UE 120 may select an updated transmit beam that is not associated with the MPE condition. As another example, the UE 120 may select a beam for any cell and any bandwidth part of the UE 120.

As shown by reference number 330, the UE 120 may transmit the message (e.g., the MsgA-PRACH). The message may indicate that the MPE condition is satisfied for the UE 120. For example, the message may be transmitted on a different beam than the beam for which the MPE condition is satisfied. In some aspects, the UE 120 may transmit the message on a selected beam even when an uplink grant is available. For example, the UE 120 may not use the uplink grant to transmit the message. As shown by reference number 340, the UE 120 may transmit a payload of the MsgA-PRACH. For example, the UE 120 may transmit a MsgA physical uplink shared channel (MsgA-PUSCH) in association with the message. As further shown, the payload may include information indicating the updated uplink beam (e.g., the updated transmit beam) selected by the UE 120. For example, the payload may include a medium access control (MAC) control element (CE) or another form of information that indicates the updated transmit beam.

As shown by reference number 350, the UE 120 may receive, from the BS 110, a response on a downlink active beam. The response may acknowledge the message transmitted by the UE 120 and/or the updated transmit beam. As shown by reference number 360, in some aspects, the response may be a random access response (RAR). For example, the response may be scrambled using a random access radio network temporary identifier (RA-RNTI) that is associated with responses to messages associated with MPE conditions being satisfied. In some aspects, the downlink active beam may not be configured for the RAR. For example, the RAR may be provided on any downlink active beam of the UE 120 (e.g., a beam with a lowest control resource set identifier or another beam). Thus, the BS 110 may provide a response to the UE 120 on an already-active downlink beam, thus reducing interruption and latency that would otherwise be incurred by configuring a new downlink beam based at least in part on the PRACH procedure initiated by the UE 120.

As indicated above, FIG. 3 is provided as an example. Other examples may differ from what is described with respect to FIG. 3.

Figure 4:
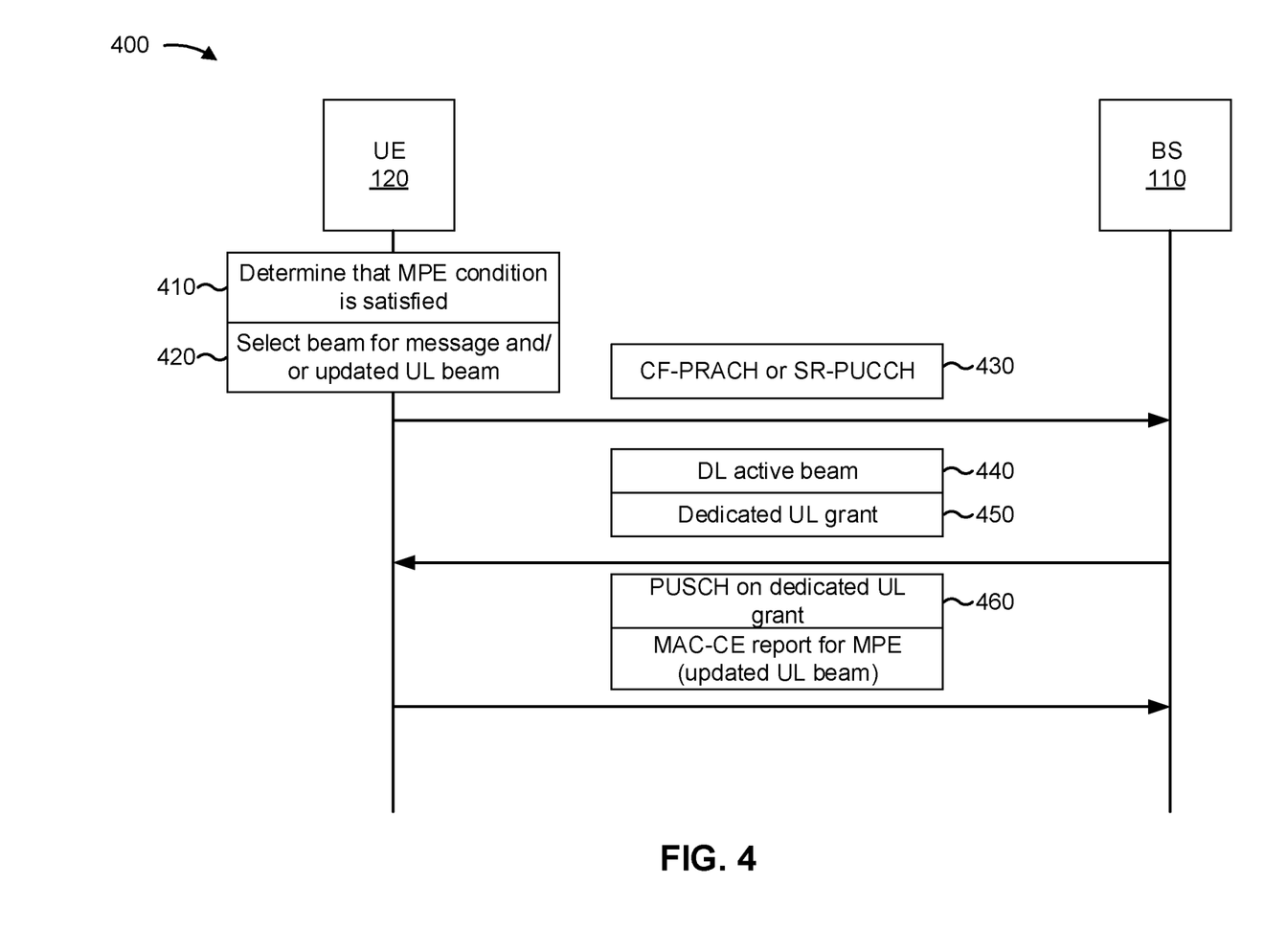
FIG. 4 is a diagram illustrating an example of a second procedure for indicating that an MPE condition is satisfied, in accordance with various aspects of the present disclosure.

FIG. 4 is a diagram illustrating an example 400 of a second procedure for indicating that an MPE condition is satisfied, in accordance with various aspects of the present disclosure. The procedure described in example 400 is referred to herein as a three-step scheme. As shown, example 400 includes a UE 120 and a BS 110. The UE 120 and the BS 110 may be associated with a communication link, as described in more detail in connection with FIG. 3.

As shown by reference number 410, the UE 120 may determine that an MPE condition is satisfied. As shown by reference number 420, the UE 120 may select a beam for the message and/or a beam for the updated transmit beam. These operations are described in more detail in connection with FIG. 3.

As shown by reference number 430, the UE 120 may transmit, to the BS 110, a message indicating that the MPE condition is satisfied. For example, the message may include a contention-free physical random access channel (CF-PRACH) message, a scheduling request physical uplink control channel (SR-PUCCH) message, and/or the like. In some aspects, the message may be dedicated for MPE reporting. By receiving the message from the UE 110, the BS 120 can be indicated that there is a MPE at UE 110, and can prepare for a response. In some aspects, the message may be transmitted using any beam, such as a beam selected at reference number 420. For example, the message may be transmitted using an uplink transmit beam that is not pre-configured for the SR-PUCCH or the CF-PRACH. The resource or occasion of SR-PUCCH or CF-PRACH that is used for the message may be associated with a downlink beam. By the UE 120 selecting a resource or occasion of SR-PUCCH or CF-PRACH, a downlink beam may be also indicated to the BS 110. The downlink beam may be one of the downlink active beams at the UE 120. For example, the downlink active beam can be a beam configured for the UE 120 to monitor for a control resource set (e.g., the beam of the control resource with the lowest identifier).

As shown by reference number 440, the UE 120 may receive a response to the message on a downlink active beam, which is described in more detail in connection with FIG. 3. The downlink active beam may be the one associated and/or indicated with the resource or occasion of the massage. As shown by reference number 450, the response may include an uplink grant, such as a dedicated uplink grant for information indicating the updated transmit beam. For example, the uplink grant may be transmitted on a control resource set and/or a search space, which may be RRC configured to be specific to the UE 120 and/or dedicated for receiving the response of the message. The uplink grant can be associated with resource allocations for information indicating the updated transmit beam. Thus, the UE 120 may monitor an uplink grant (e.g., uplink downlink control information (UL-DCI)) on the control resource set and/or the search space to determine that there is a resource allocation for the information indicating the updated transmit beam. In some aspects, the UL-DCI may be scrambled by the cell-RNTI (C-RNTI) associated with the UE 110. As shown by reference number 460, the UE 120 may transmit a physical uplink shared channel (PUSCH) based at least in part on the uplink grant. For example, the UE 120 may transmit the PUSCH on the same beam as the message. As further shown, the PUSCH may include information identifying the updated transmit beam, in a MAC-CE signaling and/or the like. In the case that UE 120 communicates with the BS 110 using carrier aggregation, the MAC-CE signaling can also be used to indicate one or more updated transmit beams for other component carriers associated with an MPE condition, which are different from the component carrier where the message is sent on. Thus, the UE 120 may indicate that an MPE condition is satisfied and may indicate an updated transmit beam for the UE 120 for which the MPE condition is not satisfied. The BS 110 may acknowledge such indications using an uplink grant and/or an RAR that is transmitted on an active downlink beam of the UE 120, which may reduce interruption and latency.

As indicated above, FIG. 4 is provided as an example. Other examples may differ from what is described with respect to FIG. 4.

Figure 5:
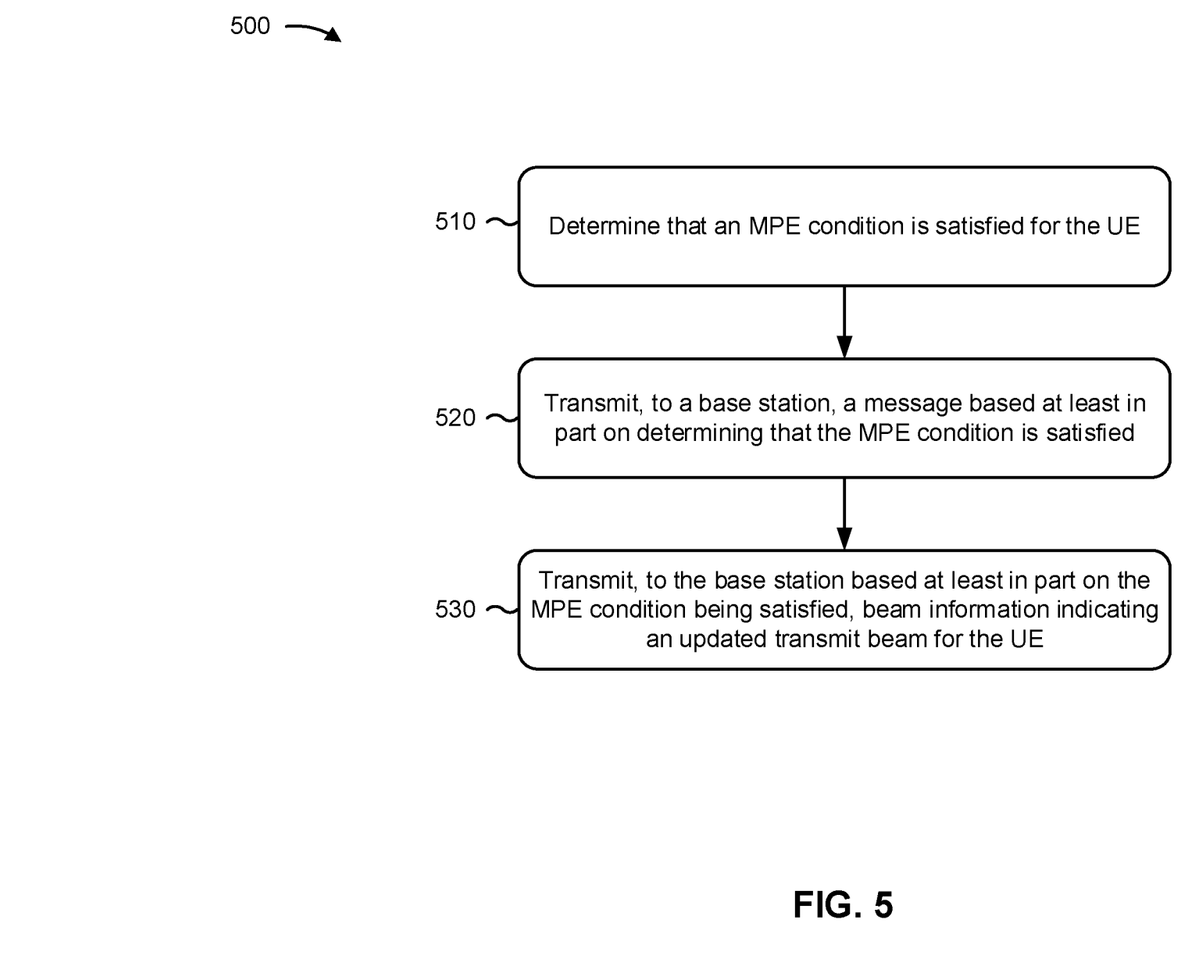
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with reporting for maximum permissible exposure.

As shown in FIG. 5, in some aspects, process 500 may include determining that an MPE condition is satisfied for the UE (block 510). For example, the UE (e.g., using controller/processor 280, transmit processor 264, TX MIMO processor 266, MOD 254, antenna 252, and/or the like) may determine that an MPE condition is satisfied for the UE, as described above.

As further shown in FIG. 5, in some aspects, process 500 may include transmitting, to a base station, a message based at least in part on determining that the MPE condition is satisfied (block 520). For example, the UE (e.g., using controller/processor 280, transmit processor 264, TX MIMO processor 266, MOD 254, antenna 252, and/or the like) may transmit, to a base station, a message based at least in part on determining that the MPE condition is satisfied, as described above.

As further shown in FIG. 5, in some aspects, process 500 may include transmitting, to the base station based at least in part on the MPE condition being satisfied, beam information indicating an updated transmit beam for the UE (block 530). For example, the UE (e.g., using controller/processor 280, transmit processor 264, TX MIMO processor 266, MOD 254, antenna 252, and/or the like) may transmit, to the base station based at least in part on the MPE condition being satisfied, beam information indicating an updated transmit beam for the UE, as described above. This beam information may be included in a payload of the message or may be transmitted separate from the message on an uplink grant.

Process 500 may include additional aspects, such as any single aspect or any combination of aspects described below and/or in connection with one or more other processes described elsewhere herein.

In a first aspect, the message includes a preamble of a random access channel message, and the beam information indicating the updated transmit beam for the UE is carried in a physical uplink shared channel of the random access channel message.

In a second aspect, alone or in combination with the first aspect, process 500 includes selecting the updated transmit beam from a set of transmit beams that do not exceed the MPE condition.

In a third aspect, alone or in combination with one or more of the first and second aspects, process 500 includes selecting a beam on which to transmit the message, wherein the beam is being different than a beam associated with satisfying the MPE condition for the UE.

In a fourth aspect, alone or in combination with one or more of the first through third aspects, process 500 includes receiving a response associated with the message.

In a fifth aspect, alone or in combination with one or more of the first through fourth aspects, the response is received on an active downlink beam of the UE.

In a sixth aspect, alone or in combination with one or more of the first through fifth aspects, the active downlink beam is associated with a lowest control resource set identifier of a group of active beams associated with the UE.

In a seventh aspect, alone or in combination with one or more of the first through sixth aspects, the active downlink beam is not changed in association with receiving the response.

In an eighth aspect, alone or in combination with one or more of the first through seventh aspects, the response includes a grant for a resource used to transmit the beam information indicating the updated transmit beam.

In a ninth aspect, alone or in combination with one or more of the first through eighth aspects, the response is associated with a particular control resource set or a particular search space indicating that the response is associated with the grant for the resource.

In a tenth aspect, alone or in combination with one or more of the first through ninth aspects, the message and the beam information indicating the updated transmit beam for the UE are transmitted on a same beam.

In an eleventh aspect, alone or in combination with one or more of the first through tenth aspects, the beam information indicating the updated transmit beam is a medium access control (MAC) control element (CE).

In a twelfth aspect, alone or in combination with one or more of the first through eleventh aspects, the message is transmitted without using an existing uplink grant of the UE.

In a thirteenth aspect, alone or in combination with one or more of the first through twelfth aspects, the message is transmitted using a contention-free physical random access channel (CF-PRACH) resource or a scheduling request physical uplink control channel (SR-PUCCH) resource.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
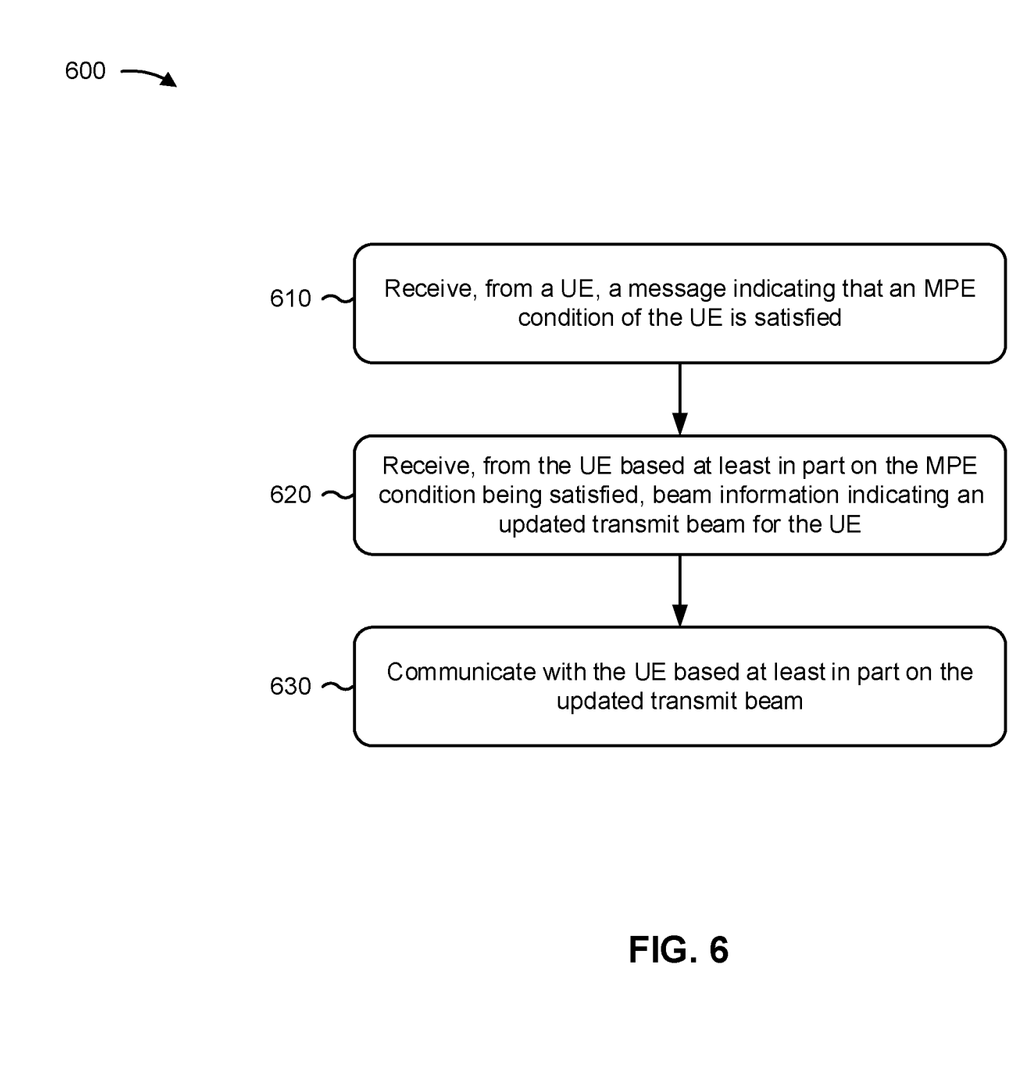
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where the base station (e.g., base station 110 and/or the like) performs operations associated with reporting for maximum permissible exposure.

As shown in FIG. 6, in some aspects, process 600 may include receiving, from a UE, a message indicating that an MPE condition of the UE is satisfied (block 610). For example, the base station may receive, from a UE, a message indicating that an MPE condition of the UE is satisfied, as described above.

As further shown in FIG. 6, in some aspects, process 600 may include receiving, from the UE based at least in part on the MPE condition being satisfied, beam information indicating an updated transmit beam for the UE (block 620). For example, the base station (e.g., using antenna 234, DEMOD 232, MIMO detector 236, receive processor 238, controller/processor 240, and/or the like) may receive, from the UE based at least in part on the MPE condition being satisfied, beam information indicating an updated transmit beam for the UE, as described above.

As further shown in FIG. 6, in some aspects, process 600 may include communicating with the UE based at least in part on the updated transmit beam (block 630). For example, the base station (e.g., using antenna 234, DEMOD 232, MIMO detector 236, receive processor 238, controller/processor 240, and/or the like) may communicate with the UE based at least in part on the updated transmit beam, as described above.

Process 600 may include additional aspects, such as any single aspect or any combination of aspects described below and/or in connection with one or more other processes described elsewhere herein.

In a first aspect, the message includes a preamble of a random access channel message, and the beam information indicating the updated transmit beam for the UE is carried in a physical uplink shared channel of the random access channel message.

In a second aspect, alone or in combination with the first aspect, a beam on which the message is received is different than a beam associated with satisfying the MPE condition for the UE.

In a third aspect, alone or in combination with one or more of the first and second aspects, process 600 includes transmitting a response associated with the message.

In a fourth aspect, alone or in combination with one or more of the first through third aspects, the response is transmitted for an active downlink beam of the UE.

In a fifth aspect, alone or in combination with one or more of the first through fourth aspects, the active downlink beam is associated with a lowest control resource set identifier of a group of active beams associated with the UE.

In a sixth aspect, alone or in combination with one or more of the first through fifth aspects, the response includes a grant for a resource used to transmit the beam information indicating the updated transmit beam.

In a seventh aspect, alone or in combination with one or more of the first through sixth aspects, the response is associated with a particular control resource set or a particular search space indicating that the response is associated with the grant for the resource.

In an eighth aspect, alone or in combination with one or more of the first through seventh aspects, the message and the beam information indicating the updated transmit beam for the UE are received on a same beam.

In a ninth aspect, alone or in combination with one or more of the first through eighth aspects, the beam information indicating the updated transmit beam is a medium access control (MAC) control element (CE).

In a tenth aspect, alone or in combination with one or more of the first through ninth aspects, the message is transmitted using a contention-free physical random access channel (CF-PRACH) resource or a scheduling request physical uplink control channel (SR-PUCCH) resource.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining that a maximum permissible exposure (MPE) condition is satisfied for the UE;
   transmitting, to a base station, a message based at least in part on determining that the MPE condition is satisfied;
   transmitting, to the base station based at least in part on the MPE condition being satisfied, beam information indicating an updated transmit beam for the UE; and
   receiving, on a downlink active beam of the UE, a response associated with the message.

2. The method of claim 1, wherein the message includes a preamble of a random access channel message, and wherein the beam information indicating the updated transmit beam for the UE is carried in a physical uplink shared channel of the random access channel message.

3. The method of claim 1, further comprising:
   selecting the updated transmit beam from a set of transmit beams that do not exceed the MPE condition.

4. The method of claim 1, further comprising:
   selecting a beam on which to transmit the message, wherein the beam is different than a beam associated with satisfying the MPE condition for the UE.

5. The method of claim 1, wherein the active downlink beam is associated with a lowest control resource set identifier of a group of active beams associated with the UE.

6. The method of claim 1, wherein the active downlink beam is not changed in association with receiving the response.

7. The method of claim 1, wherein the response includes a grant for a resource used to transmit the beam information indicating the updated transmit beam.

8. The method of claim 7, wherein the response is associated with a particular control resource set or a particular search space indicating that the response is associated with the grant for the resource.

9. The method of claim 1, wherein the message and the beam information indicating the updated transmit beam for the UE are transmitted on a same beam.

10. The method of claim 1, wherein the beam information indicating the updated transmit beam is a medium access control (MAC) control element (CE).

11. The method of claim 1, wherein the message is transmitted without using an existing uplink grant of the UE.

12. The method of claim 1, wherein the message is transmitted using a contention-free physical random access channel (CF-PRACH) resource or a scheduling request physical uplink control channel (SR-PUCCH) resource.

13. A method of wireless communication performed by a base station, comprising:
   receiving, from a user equipment (UE), a message indicating that a maximum permissible exposure (MPE) condition of the UE is satisfied;
   transmitting, on a downlink active beam of the UE, a response associated with the message;
   receiving, from the UE based at least in part on the MPE condition being satisfied, beam information indicating an updated transmit beam for the UE; and
   communicating with the UE based at least in part on the updated transmit beam.

14. The method of claim 13, wherein the message includes a preamble of a random access channel message, and wherein the beam information indicating the updated transmit beam for the UE is carried in a physical uplink shared channel of the random access channel message.

15. The method of claim 13, wherein a beam on which the message is received is different than a beam associated with satisfying the MPE condition for the UE.

16. The method of claim 13, wherein the active downlink beam is associated with a lowest control resource set identifier of a group of active beams associated with the UE.

17. The method of claim 13, wherein the response includes a grant for a resource used to transmit the beam information indicating the updated transmit beam.

18. The method of claim 17, wherein the response is associated with a particular control resource set or a particular search space indicating that the response is associated with the grant for the resource.

19. The method of claim 13, wherein the message and the beam information indicating the updated transmit beam for the UE are received on a same beam.

20. The method of claim 13, wherein the beam information indicating the updated transmit beam is a medium access control (MAC) control element (CE).

21. The method of claim 13, wherein the message is transmitted using a contention-free physical random access channel (CF-PRACH) resource or a scheduling request physical uplink control channel (SR-PUCCH) resource.

22. A user equipment (UE) for wireless communication, comprising:
   one or more memories; and
   one or more processors operatively coupled to the one or more memories, the memory and the one or more processors configured to:
      determine that a maximum permissible exposure (MPE) condition is satisfied for the UE;

transmit, to a base station, a message based at least in part on determining that the MPE condition is satisfied;

transmit, to the base station based at least in part on the MPE condition being satisfied, beam information indicating an updated transmit beam for the UE; and receive, on a downlink active beam of the UE, a response associated with the message.

23. A base station for wireless communication, comprising:

a memory; and one or more processors operatively coupled to the memory, the memory and the one or more processors configured to:

receive, from a user equipment (UE), a message indicating that a maximum permissible exposure (MPE) condition of the UE is satisfied;

transmit, on a downlink active beam of the UE, a response associated with the message;

receive, from the UE based at least in part on the MPE condition being satisfied, beam information indicating an updated transmit beam for the UE; and communicate with the UE based at least in part on the updated transmit beam.

24. The UE of claim 22, wherein the message includes a preamble of a random access channel message, and wherein the beam information indicating the updated transmit beam for the UE is carried in a physical uplink shared channel of the random access channel message.

25. The UE of claim 22, wherein the memory and the one or more processors are further configured to:

select a beam on which to transmit the message, wherein the beam is different than a beam associated with satisfying the MPE condition for the UE.

26. The base station of claim 23, wherein the message includes a preamble of a random access channel message, and wherein the beam information indicating the updated transmit beam for the UE is carried in a physical uplink shared channel of the random access channel message.

\* \* \* \* \*